US012533702B1

(12) United States Patent
Hewitt, Jr.

(10) Patent No.: US 12,533,702 B1
(45) Date of Patent: Jan. 27, 2026

(54) METHOD AND DEVICE FOR CLEANING AND ADJUSTING A SPRINKLER HEAD

(71) Applicant: Charles Fowler Lindsay Hewitt, Jr., Huntington, NY (US)

(72) Inventor: Charles Fowler Lindsay Hewitt, Jr., Huntington, NY (US)

( * ) Notice: Subject to any disclaimer, the term of this patent is extended or adjusted under 35 U.S.C. 154(b) by 29 days.

(21) Appl. No.: 18/780,604

(22) Filed: Jul. 23, 2024

(51) Int. Cl.
*B05B 15/522* (2018.01)

(52) U.S. Cl.
CPC .................................. *B05B 15/522* (2018.02)

(58) Field of Classification Search
CPC ....... B05B 15/522; B05B 15/00; B05B 15/52; B05B 15/50; B05B 15/5223; B05B 15/5225; B05B 15/55; B05B 15/555; B05B 15/60; B05B 15/14
See application file for complete search history.

(56) References Cited

U.S. PATENT DOCUMENTS 3,379,078 A 4/1968 Sallows
4,872,234 A * 10/1989 Wonnacott .............. B08B 1/165 15/104.16
5,479,670 A 1/1996 Coffey
6,234,411 B1 5/2001 Walker et al.
6,318,383 B1 11/2001 Wood
7,048,208 B1 5/2006 Pruitt et al.
D809,883 S 2/2018 Trudeau
11,602,601 B2 3/2023 Leonard et al.
2005/0051640 A1* 3/2005 Sirkin ..................... B05B 15/00 239/104
2005/0194464 A1* 9/2005 Bruninga ................ B05B 15/74 239/200
2006/0049273 A1 3/2006 Zhang
2014/0263735 A1* 9/2014 Nations ................... B05B 15/74 239/232
2015/0202748 A1 7/2015 Trudeau

OTHER PUBLICATIONS

Hunter Residential Rotor Adjustment Tool (Year: 2025).*

* cited by examiner

*Primary Examiner* — Sharidan Carrillo
(74) *Attorney, Agent, or Firm* — Collard & Roe, P.C.

(57) ABSTRACT

A method and tool for cleaning and adjusting an irrigation system sprinkler head includes a tool with tool head configured to engage an adjustment element of the sprinkler head and a curved tube having a first open end and a second open end. The tool is positioned so that the first open end of the curved tube receives a water stream exiting a nozzle of the sprinkler head and the second open end of the curved tube ejects the water stream in a direction of the adjustment element. The tool is then positioned so that the tool head engages the adjustment element and the adjustment element is turned with the tool head to adjust an operation of the sprinkler head.

6 Claims, 3 Drawing Sheets

METHOD AND DEVICE FOR CLEANING AND ADJUSTING A SPRINKLER HEAD

BACKGROUND OF THE INVENTION

Field of the Invention

The invention relates to methods and devices for cleaning and adjusting an irrigation system sprinkler head. In particular, the invention relates to methods and devices which redirect a stream of water from a sprinkler nozzle to an upper portion of the sprinkler head to clean off/out any debris which collected thereon or within and thereby facilitate access to and engagement of an adjustment element of the sprinkler head by an associated adjustment tool.

The Prior Art

Irrigation sprinkler heads include a nozzle portion which sprays water in a selected pattern over an area to be watered. Sprinkler heads may also include one or more adjustment elements, typically a hex or Allen head, Phillips head or slotted head threaded member, such as a screw or bolt, for adjusting certain parameters of the individual sprinkler's operation. These adjustment elements are typically disposed on an upper portion of the sprinkler head and are rotated clockwise or counter-clockwise with a corresponding tool head. For example, in the case of a gear-driven rotor sprinkler head, one adjustment element may be turned with a tool head to select a desired arc of the sprinkler spray and another adjustment element may be turned with the tool head to select a desired radius of the sprinkler spray.

When not in operation, the irrigation sprinkler head may be recessed such that it is below ground level or does not project appreciably above ground level. When in operation, pressurized water is supplied to the sprinkler head and the sprinkler head is displaced upwardly into an elevated spraying position. Such a sprinkler head is known as a pop-up sprinkler head. Additionally, the adjustment elements may be recessed below the top of the sprinkler head or disposed in recessed bores or ports in the sprinkler head.

As a result, access to the adjustment elements may be impeded or obstructed by dirt, sand, pebbles and other debris which accumulate in the area of the adjustment elements. When an adjustment element and/or a bore or port providing access to the adjustment element becomes obstructed or clogged with such debris, it becomes difficult or impossible to access and engage the adjustment element with the associated adjustment tool.

Although a number of tools for engaging the sprinkler head adjustment elements are known, a need exists for a device which includes a means for cleaning debris which has accumulated adjacent to a sprinkler head adjustment element which facilitates access to and engagement of the adjustment element by an associated adjustment tool head.

SUMMARY OF THE INVENTION

The invention relates to a method and device for cleaning and adjusting an irrigation system sprinkler head. In particular, the invention relates to methods and devices which redirect a stream of water from a sprinkler nozzle to an upper portion of the sprinkler head to clean off/out any debris which collected thereon or therein and thereby facilitate access to and engagement of an adjustment element of the sprinkler head by an associated adjustment tool.

A method for cleaning and adjusting an irrigation system sprinkler head according to an embodiment of the invention includes the steps of providing a tool having a tool head configured to engage an adjustment element of a sprinkler head and a curved tube having a first open end and a second open end. The tool is positioned so that the first open end of the curved tube receives a water stream exiting a nozzle of the sprinkler head and the second open end of the curved tube ejects the water stream in a direction of the adjustment element. The tool is then positioned so that the tool head engages the adjustment element and the adjustment element is then turned with the tool head to adjust an operation of the sprinkler head.

In a further embodiment, the step of turning the adjustment element adjusts a radius of the water stream exiting the nozzle and/or an arc of the water stream exiting the nozzle.

In another embodiment, the first open end of the curved tube is flared outwardly.

In another embodiment, the second open end of the curved tube is tapered inwardly.

In another embodiment, a diameter of the first open end of the curved tube is larger than a diameter of the second open end of the curved tube.

A sprinkler head cleanout and adjustment tool according to an embodiment of the invention includes a tool head configured to engage an adjustment element of a sprinkler head and a curved tube having a first open end and a second open end. The curved tube is configured such that when the tool is positioned with the first open end receiving a water stream exiting a nozzle of the sprinkler head, the water stream is ejected out the second open end of the curved tube in a direction of the adjustment element and is operable to wash debris away from the adjustment element.

In a further embodiment, the first open end of the curved tube is flared outwardly.

In another embodiment, the second open end of the curved tube is tapered inwardly.

In another embodiment, the diameter of the first open end of the curved tube is larger than the diameter of the second open end of the curved tube.

In another embodiment, the tool head includes a hex wrench, slotted screwdriver, Phillips head screwdriver or any other adjustment means compatible with the adjustment mechanism for any particular brand of sprinkler head.

BRIEF DESCRIPTION OF THE DRAWINGS

Other advantages, benefits and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE DRAWINGS

Figure 1:
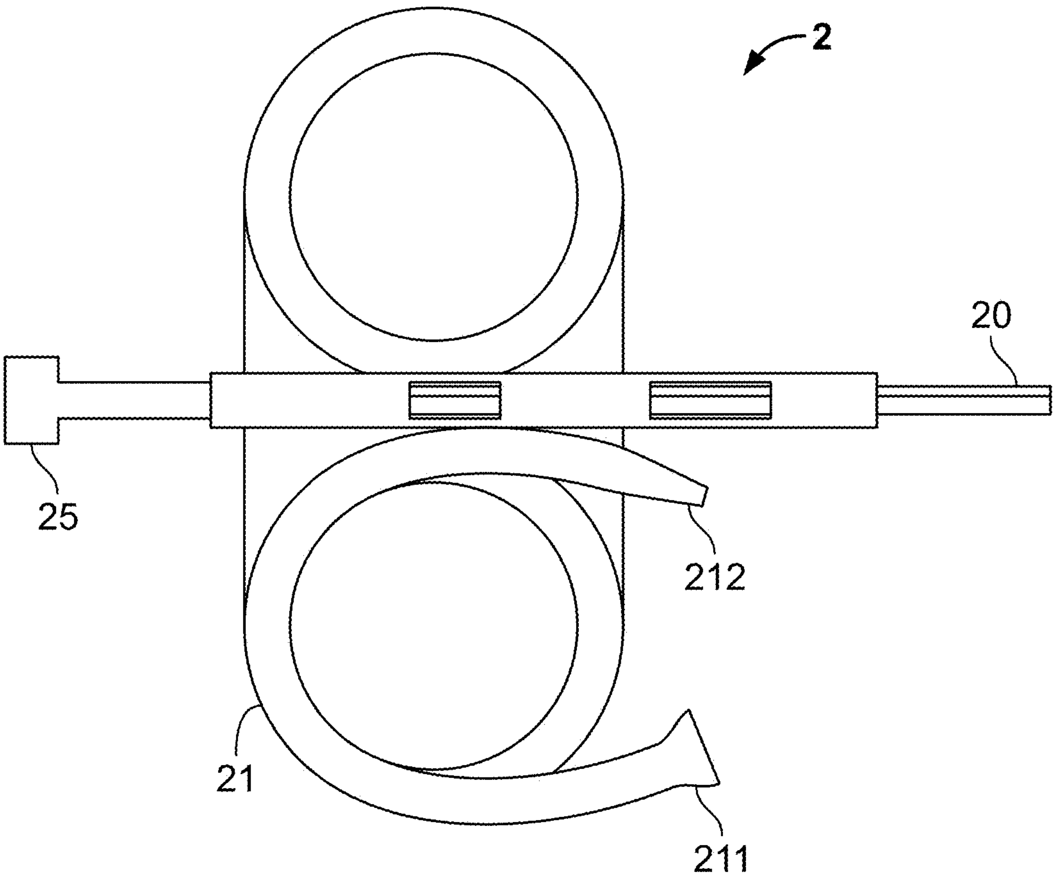
FIG. 1 shows a sprinkler head cleanout and adjustment tool according to an embodiment of the invention.

Referring now in detail to the drawings, and in particular FIG. 1 shows a sprinkler head cleanout and adjustment tool

2. As shown, the tool 2 has a tool head 20 configured to engage an adjustment element 10 of a sprinkler head 1. The tool head 20 is an elongated member or shaft and can comprise one or more of a hex wrench, slotted driver, Phillips driver, or any tool head suitable to engage the particular sprinkler head adjustment element 10. For example, tool head 20 may be a 3⁄32 inch hex key. Tool 2 may further include a t-shaped member 25 on an end opposite tool head 20 which is configured to be inserted into a corresponding opening in the sprinkler head 1, rotated and is operable lift or adjust the turning arc of the sprinkler head from a recessed or retracted position.

Figure 2:
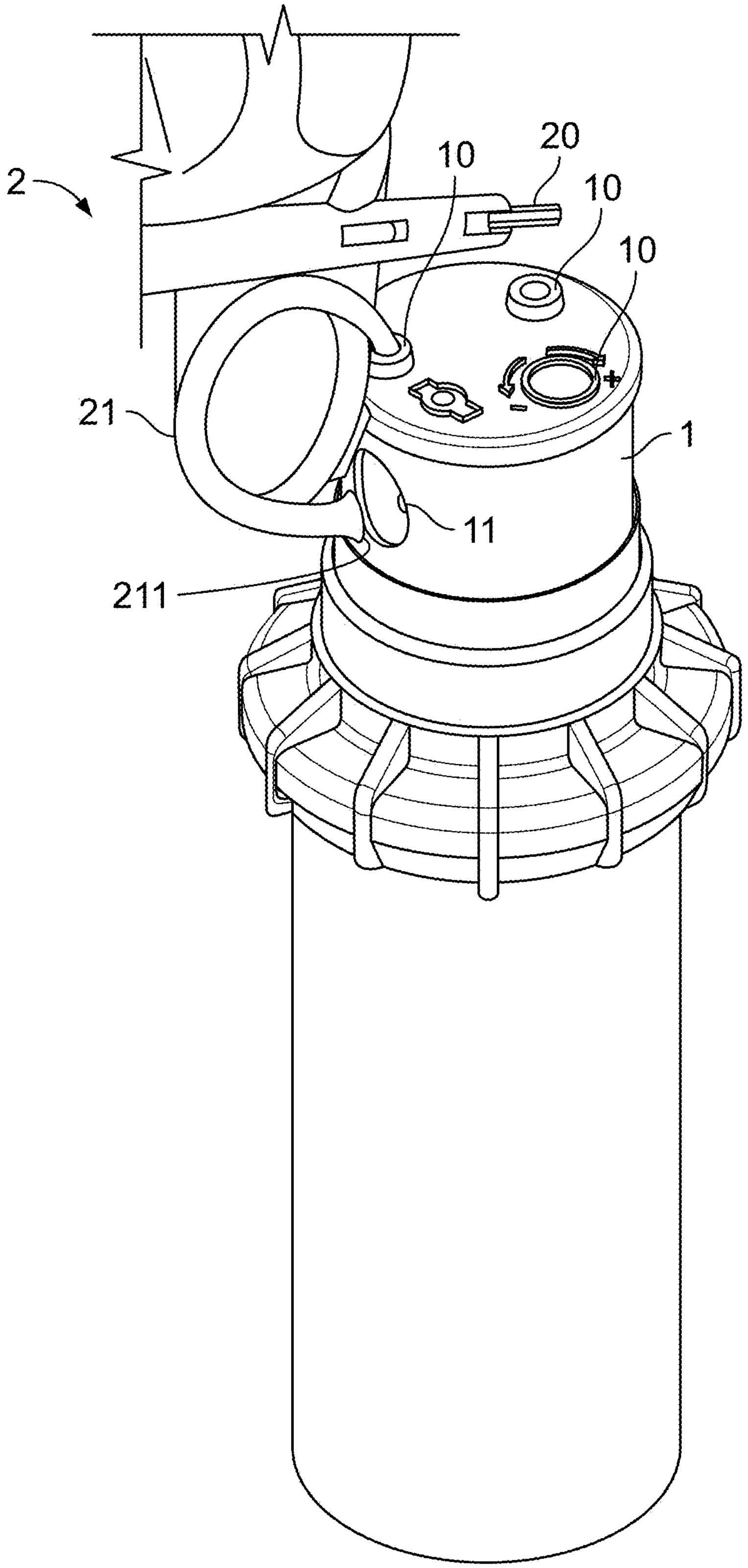
FIG. 2 shows the sprinkler head cleanout and adjustment tool positioned to direct a water stream exiting the nozzle of a sprinkler head in the direction of a sprinkler head adjustment element.

Tool 2 further includes a curved tube 21 having a first open end 211 or inlet and a second open end 212 or outlet. As shown in FIG. 2, curved tube 21 is configured such that when the tool 2 is positioned with the first open end 211 receiving a water stream exiting a nozzle 11 of the sprinkler head 1, the water stream is ejected out the second open end 212 of the curved tube 21 in a direction of the adjustment element 10 and is operable to wash debris away from the adjustment element 10.

Curved tube 21 may be formed from a metal, such as copper, aluminum or stainless steel or plastic or any other suitable material. For example, the tube may have an outer diameter of approximately 5⁄32 inches. Preferably the curved tube 21 and the tool head 20 are integrated into a single, compact unit, such that tool 2 can be conveniently carried in a pocket of a user.

First open end 211 of curved tube 21 may be flared outwardly in order to better capture some or all of the water stream exiting the sprinkler head nozzle 11. Second open end 212 may be tapered inwardly to create greater pressure and a directed stream. The diameter of the first open end 211 may be larger than a diameter of the second open end 212 of the curved tube 21. The tapered and reduced diameter configuration of second open end 212 of curved tube 21 serves to create greater pressure at the outlet end and provide a more directed stream for flushing debris from the adjustment elements 10.

In this way, curved tube 21 may be similar to a pitot tube, which can be positioned with the flared end 211 of the curved tube 21 operable to receive the water stream from the sprinkler nozzle 11 and the tapered end 212 operable to direct the stream of water in a direction of adjustment elements 10, thereby flushing debris away from the adjustment element 10 and/or a recessed opening leading to the adjustment element and facilitating access and engagement of the adjustment element 10 by the tool head 20.

FIG. 2 shows the tool 2 positioned so that the first open end 211 or inlet of the curved tube 21 receives a water stream exiting a nozzle 11 of the sprinkler head 1. The water stream or a portion thereof thus flows through the curved tube 21 and is ejected or exits second open end 212 in a direction of adjustment element 10.

In this way, dirt, sand, pebbles and other debris which may have accumulated in the area of the adjustment elements 10 and/or a bore or port providing access to the adjustment element 10 are washed away using the spray from the sprinkler nozzle 11. This facilitates access and engagement of the adjustment element 10 by the tool head 20.

Figure 3:
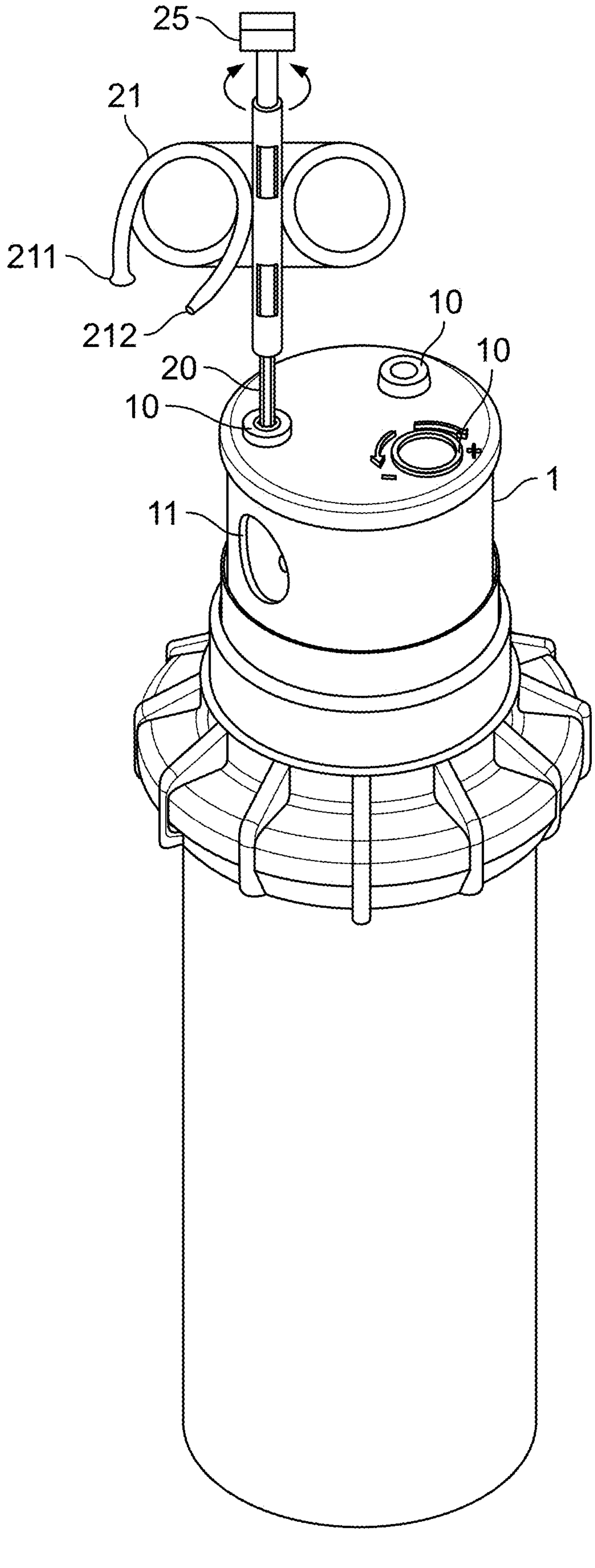
FIG. 3 shows the sprinkler head cleanout and adjustment tool positioned with a tool head engaging the adjustment element for adjusting the operation of the sprinkler head.

FIG. 3 shows the tool 2 positioned with the tool head 20 engaging an adjustment element 10. For example, a hex-shaped tool head 20 may be inserted into a corresponding hex headed screw which forms the adjustment element 10. The tool 2 is then turned or rotated in a clockwise or counter-clockwise manner in order to turning the adjustment element 10 with the tool head 20 to adjust an operation of the sprinkler head.

For example, in the case of a gear-driven rotor sprinkler head, an adjustment element 10 may be turned with the tool head 20 to select a desired arc of the water stream exiting the nozzle 11. Another adjustment element 10 may be turned with the tool head 20 to select a desired radius of the water stream exiting the nozzle 11.

Although a number of embodiments of the present invention have been shown and described, it is obvious that many changes and modifications may be made thereunto without departing from the spirit and scope of the invention.

What is claimed is:

1. A method for cleaning and adjusting an irrigation system sprinkler head, the method comprising the steps of:

providing a tool comprising a tool head configured to engage an adjustment element of a sprinkler head and a curved tube having a first open end and a second open end;

positioning the tool so that the first open end of the curved tube receives a water stream exiting a nozzle of the sprinkler head and the second open end of the curved tube ejects the water stream in a direction of the adjustment element;

cleaning the sprinkler head by redirecting the water stream from the second open end of the curved tube to an upper portion of the sprinkler head;

positioning the tool so that the tool head engages the adjustment element; and turning the adjustment element with the tool head to adjust an operation of the sprinkler head.

2. The method according to claim 1 wherein the step of turning the adjustment element adjusts a radius of the water stream exiting the nozzle.

3. The method according to claim 1 wherein the step of turning the adjustment element adjusts an arc of the water stream exiting the nozzle.

4. The method according to claim 1 wherein the first open end of the curved tube is flared outwardly.

5. The method according to claim 1 wherein the second open end of the curved tube is tapered inwardly.

6. The method according to claim 1 wherein a diameter of the first open end of the curved tube is larger than a diameter of the second open end of the curved tube.

* * * * *